(12) United States Patent
Oh et al.

(10) Patent No.: US 12,254,467 B2
(45) Date of Patent: Mar. 18, 2025

(54) ELECTRONIC DEVICE FOR PROVIDING TRANSACTION IN BLOCKCHAIN NETWORK AND OPERATING METHOD THEREOF

(71) Applicant: Samsung Electronics Co., Ltd., Suwon-si (KR)

(72) Inventors: Byeongyun Oh, Suwon-si (KR); Gyuhyun Shin, Suwon-si (KR); Woongah Yoon, Suwon-si (KR); Jinsu Jo, Suwon-si (KR); Seungmin Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 18/300,098

(22) Filed: Apr. 13, 2023

(65) Prior Publication Data

US 2023/0252461 A1  Aug. 10, 2023

Related U.S. Application Data

(63) Continuation of application No. PCT/KR2022/013546, filed on Sep. 8, 2022.

(30) Foreign Application Priority Data

Sep. 8, 2021 (KR) .................. 10-2021-0119707

(51) Int. Cl.
*G06Q 20/38* (2012.01)
*G06Q 20/02* (2012.01)
(52) U.S. Cl.
CPC ......... *G06Q 20/3825* (2013.01); *G06Q 20/02* (2013.01); *G06Q 20/3829* (2013.01)

(58) Field of Classification Search
None
See application file for complete search history.

(56) References Cited

U.S. PATENT DOCUMENTS 10,673,617 B1 * 6/2020 Antoniou ............ G06F 13/4282
10,693,954 B2    6/2020 Kozloski et al.
(Continued)

FOREIGN PATENT DOCUMENTS

EP    3 419 210 A1    12/2018
EP       3610624 A2 *  2/2020 ............. G06F 21/53
(Continued)

OTHER PUBLICATIONS

L. Bai, M. Hu, M. Liu and J. Wang, "BPIIoT: A Light-Weighted Blockchain-Based Platform for Industrial IoT," in IEEE Access, vol. 7, pp. 58381-58393. https://ieeexplore.ieee.org/document/8704309?source=IQplus (Year: 2019).*

(Continued)

*Primary Examiner* — El Mehdi Oussir
(74) *Attorney, Agent, or Firm* — Jefferson IP Law, LLP

(57) ABSTRACT

An electronic device constituting a first block node included in a blockchain network of the disclosure is provided. The electronic device performs, in response to an input of requesting a transaction, obtaining first input data, output data, and a first identification value indicating a unique value capable of identifying a first smart contract, validating a blockchain application, forwarding a public key for a private key and an input data request to the second block node, based on the validation result, receiving, from the second block node, second input data encrypted with the public key and a second identification value indicating a unique value capable of identifying a second smart contract, and transmitting transaction data including the first input data and the output data to the server node, based on the comparison (Continued)

result of the first identification value and the second identification value.

20 Claims, 9 Drawing Sheets

(56) References Cited

U.S. PATENT DOCUMENTS

| | | | |
|---|---|---|---|
| 10,756,883 B2* | 8/2020 | Brehmer | G06F 40/174 |
| 10,824,746 B1* | 11/2020 | Magerkurth | G06F 21/602 |
| 10,855,448 B2* | 12/2020 | McMurdie | H04L 9/3263 |
| 10,963,400 B2 | 3/2021 | Deshpande et al. | |
| 11,233,637 B2* | 1/2022 | Dolev | H04L 9/3239 |
| 11,258,593 B1* | 2/2022 | Cox | H04L 9/0637 |
| 11,470,150 B2 | 10/2022 | Moon et al. | |
| 12,019,574 B2* | 6/2024 | Patne | G06F 21/44 |
| 2016/0006715 A1 | 1/2016 | Lee | |
| 2018/0343114 A1 | 11/2018 | Ben-Ari | |
| 2018/0349621 A1* | 12/2018 | Schvey | H04L 9/3236 |
| 2019/0229890 A1* | 7/2019 | Brehmer | H04L 9/088 |
| 2019/0251557 A1 | 8/2019 | Jin et al. | |
| 2019/0342077 A1* | 11/2019 | McMurdie | H04L 63/123 |
| 2019/0370479 A1* | 12/2019 | Uhr | H04L 67/55 |
| 2019/0372786 A1* | 12/2019 | Ra | G06F 21/30 |
| 2020/0045019 A1* | 2/2020 | Huang | H04L 63/062 |
| 2020/0065802 A1* | 2/2020 | Mathieson | H04L 9/0637 |
| 2020/0067708 A1* | 2/2020 | Subba | H04L 9/3226 |
| 2020/0092088 A1* | 3/2020 | Novotny | G06F 21/64 |
| 2020/0127821 A1* | 4/2020 | Dolev | H04L 9/0861 |
| 2020/0273028 A1* | 8/2020 | Zhang | G06Q 20/38215 |
| 2020/0327100 A1* | 10/2020 | Androulaki | H04L 9/0643 |
| 2020/0364212 A1 | 11/2020 | Cho et al. | |
| 2020/0396089 A1* | 12/2020 | Guo | H04L 63/123 |
| 2021/0034455 A1 | 2/2021 | Deng | |
| 2021/0144017 A1* | 5/2021 | Li | H04L 9/3239 |
| 2021/0192520 A1* | 6/2021 | Patel | G06Q 20/02 |
| 2021/0279723 A1* | 9/2021 | Magerkurth | H04L 63/061 |
| 2021/0312447 A1* | 10/2021 | Georgiadis | H04L 9/0825 |
| 2021/0320806 A1 | 10/2021 | Boudreault | |
| 2021/0328814 A1* | 10/2021 | Wei | H04L 9/14 |
| 2023/0222077 A1* | 7/2023 | Patne | H04L 63/126 710/305 |
| 2023/0281604 A1* | 9/2023 | Robell | G06Q 30/018 |
| 2024/0113902 A1* | 4/2024 | Michaelis | H04L 63/04 |
| 2024/0129108 A1* | 4/2024 | Liu | H04L 9/0618 |

FOREIGN PATENT DOCUMENTS

| | | | | |
|---|---|---|---|---|
| EP | 3839791 A1 * | 6/2021 | | G06F 21/64 |
| KR | 101849917 B1 * | 10/2016 | | |
| KR | 102139551 B1 * | 3/2019 | | |
| KR | 10-2019-0115552 A | 10/2019 | | |
| KR | 10-2020-0086402 A | 7/2020 | | |
| KR | 10-2020-0101140 A | 8/2020 | | |
| KR | 10-2209852 B1 | 1/2021 | | |
| KR | 10-2229923 B1 | 3/2021 | | |
| KR | 10-2021-0090611 A | 7/2021 | | |
| WO | WO-2017127564 A1 * | 7/2017 | | G06Q 20/065 |
| WO | WO-2019072313 A2 * | 4/2019 | | G06Q 20/00 |

OTHER PUBLICATIONS

Pinheiro A, Canedo ED, Albuquerque RO, de Sousa Júnior RT. Validation of Architecture Effectiveness for the Continuous Monitoring of File Integrity Stored in the Cloud Using Blockchain and Smart Contracts. Sensors (Basel). https://pmc.ncbi.nlm.nih.gov/articles/PMC8272124/ (Year: 2021).*
D. Bakoyiannis, O. Tomoutzoglou, G. Kornaros and M. Coppola, "From Hardware-Software Contracts to Industrial IoT-Cloud Blockchains for Security," 2021 Smart Systems Integration (SSI), Grenoble, France, 2021, pp. 1-4. https://ieeexplore.ieee.org/document/9467030?source=IQplus (Year: 2021).*
M. R. Ghaderi, S. Asgari and A. E. Ghahyazi, "How Can Hyperledger Fabric Blockchain Platform Secure Power Plants Remote Monitoring," 2020 28th Iranian Conference on Electrical Engineering (ICEE), Tabriz, Iran, 2020, pp. 1-7. https://ieeexplore.ieee.org/document/9260760?source=IQplus (Year: 2020).*
M. El-Haj, A. Fadlallah, M. Chamoun and A. Serhrouchni, "Ethereum for Secure Authentication of IoT using Pre-Shared Keys (PSKs)," 2019 International Conference on Wireless Networks and Mobile Communications (WINCOM), Fez, Morocco, 2019. https://ieeexplore.ieee.org/document/8942487?source=IQplus (Year: 2019).*
E. Kfoury and D. Khoury, "Distributed Public Key Infrastructure and PSK Exchange Based on Blockchain Technology," 2018 IEEE International Conference Halifax, NS, Canada, 2018, pp. 1116-1120. https://ieeexplore.ieee.org/document/8726475?source=IQplus (Year: 2018).*
A. Kumar, T. Limbasiya and D. Das, "BlockCom: Blockchain-based Efficient Communication and Storage Protocol," 2019 25th Asia-Pacific Conference on Communications (APCC), Ho Chi Minh City, Vietnam, 2019, pp. 473-478. https://ieeexplore.ieee.org/document/9026512?source=IQplus (Year: 2019).*
International Search Report dated Dec. 20, 2022, issued in International Patent Application No. PCT/KR2022/013546.

* cited by examiner

ELECTRONIC DEVICE FOR PROVIDING TRANSACTION IN BLOCKCHAIN NETWORK AND OPERATING METHOD THEREOF

CROSS-REFERENCE TO RELATED APPLICATION(S)

This application is a continuation application, claiming priority under § 365(c), of an International application No. PCT/KR2022/013546, filed on Sep. 8, 2022, which is based on and claims the benefit of a Korean patent application number 10-2021-0119707, filed on Sep. 8, 2021, in the Korean Intellectual Property Office, the disclosure of which is incorporated by reference herein in its entirety.

TECHNICAL FIELD

The disclosure relates to an electronic device for controlling the execution of a function by using a blockchain network, and an operating method thereof. More particularly, the disclosure relates to an electronic device capable of performing a consensus on a transaction with electronic devices that are block nodes included in a blockchain network, and an operating method thereof.

BACKGROUND ART

A blockchain network is a network which is differentiated from a centralized network in which decision-making is performed by a central server, and is expressed as a decentralized network. The blockchain network may refer to a network in which decision-making is performed according to a consensus algorithm of nodes participating in the blockchain network.

A distributed ledger existing in the blockchain network can include at least one block created based on a transaction executed in the blockchain network, and a database storing data related to the transaction. The distributed ledger may be stored in each of nodes participating in the blockchain network. The distributed ledger existing in the blockchain network can be updated according to a consensus algorithm of nodes participating in the blockchain network. The distributed ledger can link and include at least one block. The link of these blocks can be expressed as a blockchain.

To maintain security and integrity, the distributed ledger can be updated according to the consensus algorithm of the nodes participating in the blockchain network. Specifically, the block nodes participating in the blockchain network can perform a transaction endorsement operation, a transaction ordering operation, and a validation operation, so as to confirm the block created based on the transaction.

The above information is presented as background information only to assist with an understanding of the disclosure. No determination has been made, and no assertion is made, as to whether any of the above might be applicable as prior art with regard to the disclosure.

DISCLOSURE

Technical Problem

A blockchain network can include block nodes making a blockchain system valid. The block nodes can consist of electronic devices.

To create a block as performing at least one transaction in the blockchain network, a transaction endorsement operation has to be performed between the block nodes included in the blockchain network. The block nodes performing the transaction endorsement operation may be expressed as endorsers.

To endorse a transaction, the block nodes each have to execute a smart contract on the transaction. For example, to endorse the transaction, all of the block nodes associated with transaction execution can execute the smart contract on the requested transaction, respectively, and mutually compare an input value (e.g., a read-set) and a result value (e.g., a write-set) for the smart contract, obtained through the execution. If it is determined to match as a result of comparing the input value and the result value for the smart contract of each of all the block nodes, the block nodes may determine that the transaction is endorsed, and complete the transaction endorsement operation.

In this case, when the block nodes included in the blockchain network execute the smart contract whenever the transaction is requested, a problem arises in that the battery consumption of the electronic device constituting the block node becomes faster. Also, as the electronic device constituting the block node repeatedly executes the smart contract, usability can be decreased, and various performance problems including the use of a central processing unit (CPU) can occur.

Aspects of the disclosure are to address at least the above-mentioned problems and/or disadvantages and to provide at least the advantages described below. Accordingly, an aspect of the disclosure is to provide a transaction in blockchain network and operating method thereof.

Additional aspects will be set forth in part in the description which follows and, in part, will be apparent from the description, or may be learned by practice of the presented embodiments.

Technical Solution

In accordance with an aspect of the disclosure, an electronic device constituting a first block node that is included in a blockchain network is provided. The electronic device includes a communication circuit for communicating with a second block node and a server node that are included in the blockchain network, and a security module for storing a unique key granted to the electronic device, a certificate for the unique key, and a private key for a user account, and a memory for storing a first smart contract and a blockchain application that is digitally signed with the unique key, and at least one processor electrically connected to the communication circuit, the security module, and the memory. The at least one processor may, in response to an input of requesting a transaction, obtain first input data, output data, and a first identification value indicating a unique value capable of identifying the first smart contract, based on the first smart contract, and validate the blockchain application by using the certificate, and forward a public key for the private key and an input data request to the second block node, based on the validation result, and receive, from the second block node, second input data encrypted with the public key and a second identification value indicating a unique value capable of identifying a second smart contract previously stored in the second block node, the second input data being data required for the execution of the second smart contract, and transmit transaction data including the first input data and the output data to the server node, based on the comparison result of the first identification value and the second identification value.

In accordance with another aspect of the disclosure, an operating method of an electronic device constituting a first block node included in a blockchain network is provided. The operating method includes, in response to an input of requesting a transaction, obtaining first input data, output data, and a first identification value indicating a unique value capable of identifying a first smart contract, based on the first smart contract, and validating a blockchain application by using a certificate that is based on a unique key for the electronic device, and forwarding a public key for a user account and an input data request, to a second block node included in the blockchain network, based on the validation operation, and receiving, from the second block node, second input data encrypted with the public key, and a second identification value indicating a unique value capable of identifying a second smart contract previously stored in the second block node, the second input data being data required for the execution of the second smart contract, and comparing the first identification value and the second identification value, and transmitting transaction data including the first input data and the output data, to a server node included in the blockchain network, based on the result of the comparing operation. The electronic device may include a security module for storing the unique key, the certificate, and a private key corresponding to the public key, and include a memory for storing the first smart contract and/or the blockchain application digitally signed with the unique key.

In accordance with another aspect of the disclosure, a blockchain system at least including a first electronic device and a second electronic device as block nodes, respectively, a first server, and a second server is provided. The first electronic device may include a security module for storing a private key for a user account, a unique key for the first electronic device, and a certificate for the unique key, and the first electronic device may include a memory for storing a first server certificate that is obtained from the first server, based on the unique key, a blockchain application encrypted with a public key corresponding to the private key, and a first smart contract encrypted with the public key, and the first electronic device may, in response to a transaction request, provide a secure connection with the second electronic device through the second server, the secure connection being provided as the second server validates the first server certificate, and forward the public key corresponding to the private key and an input data request to the second electronic device through the secure connection, and receive a second identification value indicating a unique value capable of identifying a second smart contract previously stored in the second electronic device, encrypted with the public key, and second input data about the second smart contract, from the second electronic device, through the secure connection, and validate the transaction, based on at least one comparison result among the comparison result of a first identification value indicating a unique value capable of identifying the first smart contract and the second identification value, and the comparison result of first input data about the first smart contract and the second input data.

Advantageous Effects

According to the disclosure, when providing a transaction, an electronic device may validate and provide the transaction in a more simplified method than a method of transaction provision in a general blockchain network.

An electronic device of the disclosure may validate the integrity of a blockchain application through digital signature for an application performing a blockchain related operation.

An electronic device of the disclosure may transmit and/or receive data through a channel in which security is maintained, when communicating with other external devices in a blockchain network.

An electronic device of the disclosure may maintain a consensus authentication level such as a consensus authentication level of providing a transaction in a general blockchain, even though not executing a smart contract in other block node participating in a consensus.

At least one block node in a blockchain network that uses an electronic device of the disclosure as a transaction providing node may decrease unnecessary power consumption, and improve performance, by omitting an operation of execution of a smart contract.

Other aspects, advantages, and salient features of the disclosure will become apparent to those of skilled in the art to from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
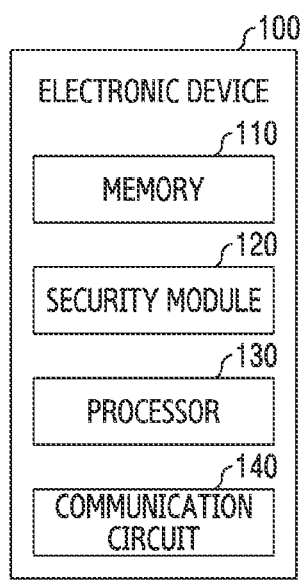
FIG. 1 is a block diagram of an electronic device according to an embodiment of the disclosure.

FIG. 1 is a block diagram of an electronic device according to an embodiment of the disclosure.

Referring to FIG. 1, an electronic device 100 may include a memory 110, a security module 120, a processor 130, and a communication circuit 140 or a combination thereof. In various embodiments, the electronic device 100 may include additional components in addition to the components illustrated in FIG. 1, or may omit at least one of the components illustrated in FIG. 1.

According to an embodiment, the memory 110 may store instructions for the processor 130 to process data or control the components of the electronic device 100 in order to perform an operation of the electronic device 100 when executed. According to an embodiment, the memory 110 may include at least one blockchain application performing a blockchain related operation. For example, the memory 110 may include the blockchain application performing the blockchain related operation or a blockchain platform corresponding to a blockchain module. Accordingly, the blockchain application may include instructions of allowing the processor 130 to control the components of the electronic device 100 in order to perform the blockchain related operation when executed.

According to an embodiment, the memory 110 may include a distributed ledger for a blockchain network. According to an embodiment, the distributed ledger may include at least one block each including at least one transaction in the blockchain network, and a state database. According to an embodiment, the memory 110 may store a distributed ledger including at least one block corresponding to each of at least one transaction in which the electronic device 100 participates in a consensus. Also, the memory 110 may store, in the state database, data about the at least one transaction in which the electronic device 100 participates in the consensus. According to an embodiment, the memory 110 may include at least one smart contract that is executed in response to a transaction execution request. Accordingly, in response to a transaction request, the electronic device 100 may obtain a smart contract on a requested transaction from the memory 110, and execute the smart contract.

According to an embodiment, the electronic device 100 may include a security module 120 (e.g., a trusted execution environment (TEE) and a secure element (SE)) that is an execution environment having a plurality of security levels for the sake of security enhancement. The security module 120 may store data requiring a relatively high security level within a safe environment (e.g., store in a security region (e.g., a trust zone) accessible only through a secure operating system (OS)), and perform a related operation. The security module 120 of an embodiment may operate on an application processor of the electronic device 100, and may operate based on a reliable hardware structure that is determined in a manufacturing process of the electronic device 100. According to an embodiment, the security module 120 may be distinguished in one region of the memory 110 or be distinguished as a construction separate from the memory 110, and operate as a security region. For example, the security module 120 may distinguish one processor 130 and one memory 110 into a general module (e.g., a rich execution environment (REE)) and the security module 120 in hardware, and use (e.g., a trust zone of ARM). For another example, the security module 120 may be configured wherein a processor for operating the security module 120 is implemented in an on-chip form such as the processor 130 of the electronic device 100, but is implemented as a separate processing core set. For further example, the security module 120 may be configured wherein a processor for the security module 120 is implemented as a chip separate in hardware and is separated from the processor 130.

According to an embodiment, the security module 120 may be configured to operate software or hardware requiring security only in a security region. Also, the electronic device 100 may operate the memory 110 or the security module 120 through a physical change of hardware or a logic change of software.

According to an embodiment, the security module 120 may store a unique key (e.g., an attestation key) granted to the electronic device 100, a certificate (e.g., an attestation root certificate) for the unique key, and a private key (e.g., an attestation user key (AUK)) for a user account. The private key of an embodiment may be provided through a key-manager (not shown) included in the security module 120. According to an embodiment, the unique key may be presented in a production operation of the electronic device 100. For example, the electronic device 100 may include the unique key in a factory initialization operation. According to various embodiments, the unique key may be configured in hardware, and be implemented in software. According to an embodiment, the security module 120 may perform, through the unique key, a validation operation on data that is digitally signed using the unique key. A detailed description of the security module 120 of an embodiment will be described later with reference to FIG. 2.

According to an embodiment, the processor 130 may be electrically or operatively connected to the memory 110, the security module 120, and the communication circuit 140. According to an embodiment, the processor 130 may execute computation, or data processing, on control and/or communication of at least one other component of the electronic device 100 by using the instructions stored in the memory 110. According to an embodiment, the processor 130 may include at least one of a central processing unit (CPU), a graphics processing unit (GPU), a micro controller unit (MCU), a sensor hub, a supplementary processor, a communication processor, an application processor, an application specific integrated circuit (ASIC), and field programmable gate arrays (FPGA), and may have a plurality of cores.

According to an embodiment, the processor 130 may perform a blockchain related operation through a blockchain application stored in the memory 110. According to an embodiment, the processor 130 may obtain a request for transaction. For example, the processor 130 of the electronic device 100 may detect a request for performing a transaction having occurred from a user or in an application.

According to an embodiment, in response to the request for transaction, the processor 130 may obtain input data (e.g., a read-set), output data (e.g., a write-set), and a hash value of a smart contract on the transaction, based on the smart contract. For example, the processor 130 may obtain first input data (e.g., a first read-set), output data (e.g., a write-set), and a first hash value of a first smart contract, based on the first smart contract.

Hereinafter, the hash value shown in the disclosure may be provided from data of the smart contract by using a hash function. For example, the processor 130 may obtain the hash value of the smart contract, by using the hash function such as secure hashing algorithm (SHA) 256. However, a value indicating unique data capable of identifying the smart contract may correspond to the hash value shown in the disclosure below. For example, it is not limited to the hash value, and besides the hash value, various values such as an identification value indicating unique data capable of identifying a target may correspond to the hash value. For example, a unique value capable of identifying a smart contract may be expressed as the identification value as well as the hash value. In conclusion, a function of the hash value shown in the disclosure may be performed instead by the identification value, without being limited to the hash value expression.

The input data of an embodiment may include data to read in order to execute a smart contract. For example, the first input data is a value to read from the distributed ledger in order to execute the first smart contract, and may include at least some of a data value, hash information, node information, and a block number. According to an embodiment, the output data may include data to be updated when the execution of the smart contract is completed. For example, the output data may include data to be updated in a state database included in the distributed ledger as the first smart contract is executed.

According to an embodiment, in response to a transaction request, the processor 130 may execute a first smart contract, and obtain first input data and output data. Also, the processor 130 may obtain a hash value that is a unique value for the first smart contract. In an embodiment, when the first smart contract is altered, the hash value may be changed.

According to an embodiment, the processor 130 may validate a blockchain application by using a certificate stored in the security module 120. For example, the processor 130 may validate, through a certificate for the unique key, the blockchain application digitally signed with a unique key. According to an embodiment, as confirming, through the certificate for the unique key, that the blockchain application is digitally signed with the correct unique key, the processor 130 may validate that the blockchain application has not been altered.

According to an embodiment, the processor 130 may forward a public key for a private key stored in the security module 120, and an input data request, to a block node included in the blockchain network, based on the validation result of the blockchain application. For example, the processor 130 may forward a public key and an input data request about a smart contract, to a second block node included in the blockchain network. The second block node in an embodiment may indicate an endorser node for a requested transaction.

According to an embodiment, the processor 130 may obtain, from an endorser node, input data encrypted with a public key, and a hash value of a smart contract previously stored in the endorser node. For example, the processor 130 may receive, from a second block node, second input data encrypted with the public key, and a second hash value of a second smart contract previously stored in the second block node. According to an embodiment, the second input data may be data required for the execution of the second smart contract.

According to an embodiment, to perform a transaction endorsement operation, the processor 130 may validate a smart contract of an external device. According to an embodiment, to endorse the smart contract of the external device on a transaction, the electronic device 100 may compare a hash value of a smart contract stored in the electronic device 100 and a hash value of the smart contract obtained from the external device. For example, the processor 130 may compare a first hash value of a first smart contract and a second hash value of a second smart contract.

According to an embodiment, when they match as a result of comparing the hash values of the smart contracts of the electronic device 100 and the external device, the processor 130 may validate that the smart contract of the external device has not been altered, and is the same as the smart contract of the electronic device 100. Accordingly, the processor 130 may endorse a transaction without executing the smart contract of the external device.

Conventionally, in order to endorse a transaction, the electronic device 100 and the external device each have to execute the smart contracts on the transaction and compare the results.

According to an embodiment, the processor 130 may validate that the smart contract of the external device is the same as the smart contract of the electronic device 100 through the hash values of the smart contracts, and execute only the smart contract stored in the electronic device 100, thereby endorsing and executing the transaction. According to an embodiment, the processor 130 may transmit transaction data including input data about the smart contract and output data, to a server node, based on the comparison result, and make a request for transaction ordering and block provision. For example, the processor 130 may transmit transaction data including first input data and output data to the server node, based on the comparison result of the first hash value and the second hash value.

According to an embodiment, the communication circuit 140 may be configured to connect to an external device and transmit and/or receive data. According to an embodiment, the electronic device 100 may form a blockchain network with at least one external device through the communication circuit 140. The blockchain network may include the at least one external device and the electronic device 100, as block nodes. Accordingly, the electronic device 100 and/or the at least one external device may act as clients while being block nodes. In an embodiment, the electronic device 100 may transmit and/or receive data with the at least one external device included in the blockchain network, through the communication circuit 140, and perform a transaction endorsement operation and validation operation so as to confirm a block provided based on a transaction.

According to an embodiment, the electronic device 100 may obtain, from a first server (e.g., a certificate authority (CA)), a certificate for the first server (e.g., a CA certificate) through the communication circuit 140. The first server may refer to an authority that issues the certificate for the first server and proves the integrity of the electronic device 100.

For example, the electronic device 100 may prove, to the first server, that the electronic device 100 and/or a blockchain application included in the electronic device 100 have not been altered by using the unique key, and as it is proved not to have been altered, the electronic device 100 may obtain a certificate for the first server from the first server through the communication circuit 140. The certificate for the first server of an embodiment may include a public key of the electronic device 100, a valid period of the certificate, and various information of the electronic device 100. Hereinafter, the first server is a certificate authority that manages authentication on communication between block nodes included in the blockchain network, and may represent an authority distributing the certificate.

According to an embodiment, the electronic device 100 may provide a secure connection with an external device through a second server (e.g., a relay server), by using a certificate for a first server through the communication circuit 140. The second server of an embodiment is a server that plays a role of connecting between devices, and may allow connection only to devices including the certificate for the first server. Accordingly, the electronic device 100 may provide a secure connection with external devices whose integrity is endorsed, through the second server. For example, the second server may ensure a secure connection by validating the certificate for the first server every communication. Hereinafter, the second server is a server that plays a role of establishing a channel connection therebetween for communication between devices, and may refer to a server that validates a device every communication, to provide a secure connection, and performs communication through the secure connection.

According to various embodiments, the electronic device 100 may form a blockchain network through the communication circuit 140. The blockchain network may include a server node and/or a mobile node, as block nodes. According to an embodiment, the mobile node is the electronic device 100 and/or an external electronic device, and may represent a portable electronic device. For example, the electronic device 100 and/or the external electronic device may correspond to a mobile device, a tablet personal computer (PC), and/or a laptop computer. A description of the blockchain network of various embodiments is made later with reference to FIG. 3.

Figure 2:
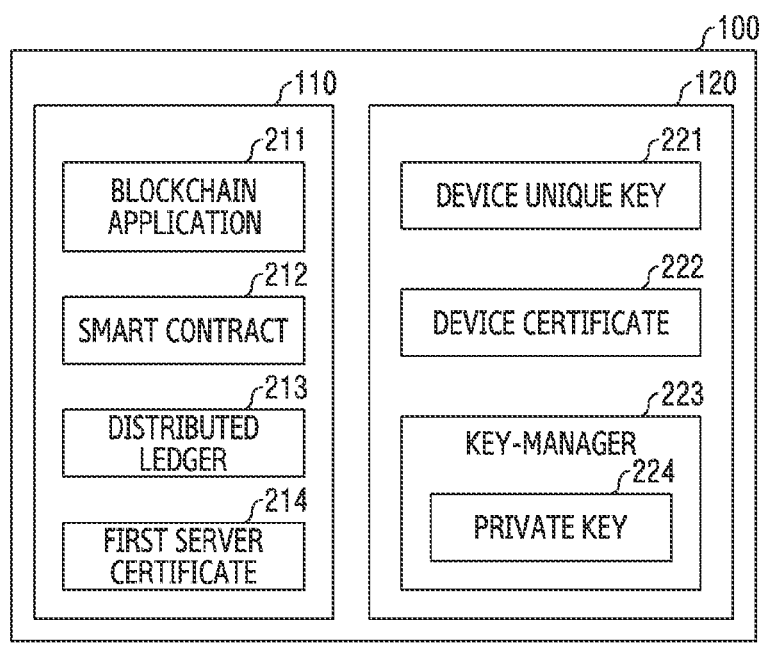
FIG. 2 is a diagram for explaining a memory and a security module of an electronic device according to an embodiment of the disclosure.

FIG. 2 is a diagram for explaining a memory and a security module of an electronic device according to an embodiment of the disclosure.

Referring to FIG. 2, an electronic device 100 may include a memory 110 and a security module 120. Contents overlapping with those described with reference to FIG. 1 may be omitted below. According to an embodiment, the memory 110 may include a blockchain application 211, a smart contract 212, a distributed ledger 213, and a first server certificate 214. According to an embodiment, the security module 120 may include a device unique key 221, a device certificate 222, and a key-manager 223, and may include a private key 224 provided by the key-manager 223.

According to an embodiment, the blockchain application 211 may perform an operation related to a blockchain as being executed by the processor 130. For example, as the blockchain application 211 is executed, the blockchain application 211 may perform an operation related to another component stored in the memory 110 or may perform an operation related to another component stored in the security module 120. According to an embodiment, the electronic device 100 may include various applications that use a blockchain function. The blockchain application 211 may obtain a request from the applications, and perform a function of a block node. According to an embodiment, the blockchain application 211 may include instructions of allowing the processor 130 to control the components of the electronic device 100 in order to perform the blockchain related operation when executed. Accordingly, an operation performed as the blockchain application 211 is executed may be expressed as being done by the processor 130.

According to an embodiment, as the blockchain application 211 is executed, the blockchain application 211 may control operations of components included in the memory 110 or the security module 120. For example, the blockchain application 211 may execute a transaction including ledger synchronization, transaction signature, and/or transaction recording execution on the blockchain network. According to an embodiment, the blockchain application 211 may be digitally signed with the device unique key 221, in order to prove that the blockchain application 211 has not been altered. According to an embodiment, the blockchain application 211 may be signed with the device unique key 221 and distributed in a production operation of the electronic device 100.

According to an embodiment, the memory 110 may include the smart contract 212. According to an embodiment, the processor 130 may obtain the smart contract 212 by using an external server, and store the obtained smart contract 212 in the memory 110. Accordingly, the smart contract 212 may obtain a value (e.g., a read-set) required for performing a transaction, through the blockchain application 211, and store a value (e.g., a write-set) outputted by executing the smart contract 212.

According to an embodiment, the processor 130 may provide a public key through the key-manager 223, and encrypt the smart contract 212 with the public key, and store the encrypted smart contract 212 in the memory 110. According to an embodiment, the processor 130 may execute the blockchain application 211 and perform an encryption operation for the smart contract 212. For example, the smart contract 212 may be encrypted using the public key through the blockchain application 211. The processor 130 may request the encryption of the smart contract 212 to the key-manager 223 through the blockchain application 211. Accordingly, the smart contract 212 encrypted with the public key may be stored in the memory 110.

In an embodiment, the distributed ledger 213 may include a blockchain provided by a blockchain network, and a state database. According to an embodiment, the distributed ledger 213 may store data about a transaction related to the electronic device 100 in the blockchain network. For example, the distributed ledger 213 may store a block and data that are based on a transaction for which consensus processing has been performed in the blockchain network. According to an embodiment, the distributed ledger 213 may be the entire ledger of the blockchain network. According to another embodiment, the distributed ledger 213 may be a partial ledger including at least a part of the entire ledger. For example, the distributed ledger 213 may be a partial ledger storing a block and data for a transaction related to the electronic device 100 among the entire ledger storing a block and data related to all transactions in the blockchain network.

According to an embodiment, the blockchain included in the distributed ledger 213 may include at least one block provided through the blockchain network. The block may include a block header and transaction data. According to an embodiment, the block header may include at least one of a hash value of a header and a data region, a hash value of a previous block, a height value of a block indicating the number of blocks provided from a genesis block, a hash value of state data after execution of a transaction included in a block, a public key of a block provider, a value signing a hash with a private key of the block provider, and a value signing a hash value with an attestation key certificate chain or an attestation key.

Block data may include at least one of a hash value of at least a part of transaction data, version information of a smart contract, a smart contract identifier (ID), a smart contract function ID, smart contract data that is a factor value required for a smart contract function, a nonce value that is a transaction provision number of a transaction provider, a public key of the transaction provider, a value signing a hash value with a private key of the transaction provider, and/or a value signing an attestation key authentication chain or a hash value with an attestation key.

In an embodiment, the state database may store, in a key-value form, values that are changed due to transaction execution in the blockchain network. For example, the state database may store values which are changed due to execution of a transaction related to the electronic device 100 in the blockchain network. According to an embodiment, the key-value form may include a key of data, a data value, a hash of data, information of a block node that owns data in the blockchain network, and a block number. In an embodiment, the data stored in the state database may be expressed as state data. The state data, for example, may refer to data stored in a world state that is a database used in a hyperledger fabric. However, the disclosure is not limited thereto.

The state database is a type of database used in the hyperledger fabric, and may store, in a key-value form, final values changed by executing a transaction. Accordingly, the state database may be checked in order to check the final values by the transaction execution in the blockchain network.

According to an embodiment, the processor 130 may provide a public key through the key-manager 223, and encrypt the distributed ledger 213 with the public key, and store the encrypted distributed ledger 213 in the memory 110. According to an embodiment, the processor 130 may execute the blockchain application 211 and perform an encryption operation for the distributed ledger 213. For example, the distributed ledger 213 may be encrypted using the public key, through the blockchain application 211. The processor 130 may request the encryption of the distributed ledger 213 to the key-manager 223 through the blockchain application 211. Accordingly, the distributed ledger 213 encrypted with the public key may be stored in the memory 110.

According to an embodiment, the processor 130 may execute the blockchain application 211 and obtain the first server certificate 214 (e.g., a CA certificate) from a first server (e.g., a certificate authority (CA)). Hereinafter, the first server certificate 214 and a certificate for the first server may be interchangeably used. According to an embodiment, the processor 130 may obtain the first server certificate 214 from the first server for the sake of communication with block nodes included in the blockchain network. For example, the electronic device 100 proves, to the first server, that the electronic device 100 and/or the blockchain application 211 included in the electronic device 100 have not been altered, by using the device unique key 221, and as it is proved not to have been altered, the electronic device 100 may obtain the first server certificate 214 from the first server.

According to an embodiment, the processor 130 may provide a secure connection with an external device through a second server (e.g., a relay server) by using the first server certificate 214. According to an embodiment, the processor 130 may use the second server by executing the blockchain application 211 and performing a validation operation through the first server certificate 214. According to an embodiment, the secure connection provided through the second server is a channel accessible only by the block nodes included in the blockchain network, and the processor 130 may transmit and/or receive data through the secure connection. For example, when the processor 130 communicates with other block nodes included in the blockchain network through the communication circuit 140, the processor 130 may communicate through the second server that may be used by a block node endorsed based on the first server certificate 214 among the block nodes included in the blockchain network.

According to an embodiment, the device unique key 221 is presented in a production operation of the electronic device 100, and may represent a key derived from an initial device unique key (e.g., a root attestation key). However, the disclosure is not limited thereto. According to various embodiments, the device unique key 221 may be configured in hardware or be implemented in software. An operation of obtaining the first server certificate 214 according to various embodiments is described below with reference to FIG. 4.

According to an embodiment, the security module 120 may include the device certificate 222. According to an embodiment, the device certificate 222 may validate data digitally signed with the device unique key 221. For example, in determining that the blockchain application 211 signed with the device unique key 221 has not been altered, the device certificate 222 may validate through the device certificate 222. According to an embodiment, the first server may have the device certificate 222. Accordingly, the electronic device 100 may transmit data signed with the device unique key 221, to the first server. The first server may validate the data signed with the device unique key 221, through the device certificate 222, and validate the integrity of the electronic device 100 or the integrity of the blockchain application 211.

According to an embodiment, the security module 120 may include the key-manager 223 capable of providing a key-pair. For example, the processor 130 may provide the private key 224 and the public key through the key-manager 223. According to an embodiment, as executing the blockchain application 211, the processor 130 may request the provision of the key-pair to the key-manager 223. Accordingly, below, an expression may be made in which the key-pair provision is requested through the blockchain application 211. According to an embodiment, the key-manager 223 may include a key storage. Or, a separate key storage may be included in the security module 120. According to an embodiment, the key-manager 223 may perform various operations by using a key stored in the key storage. According to an embodiment, the key-pair provided through the key-manager 223 may be stored in the key storage. According to an embodiment, the device unique key 221 and/or the device certificate 222 may be stored in the key storage.

According to an embodiment, the key-manager 223 may provide a root seed, and provide the private key 224 and the public key, based on the provided root seed. According to an embodiment, the key-manager 223 may provide the public key that is based on a hierarchical deterministic path (HD-path) by using the root seed. According to an embodiment, the root seed may use a mnemonic word, based on a mnemonic hash. Also, the root seed may be provided using various types of seeds. For example, a seed of a hexadecimal number may be used, or a seed composed of a 12-word mnemonic symbol (mnemonic) may be used.

According to an embodiment, the root seed may provide a master private key and a master chain code from a hash value provided by a hashed-based message authentication code-secure hash algorithm (HMAC-SHA) algorithm function. In a hashed value of 512 bits, the left 256 bits may be used as the private key, and the right 256 bits may be used as the chain code. The public key may be obtained using the private key 224 and an elliptic curve function.

According to an embodiment, the processor 130 may perform the encryption of data through the key-manager 223. For example, the processor 130 may request the encryption of the smart contract 212 and/or the distributed ledger 213. The key-manager 223 having obtained the request may encrypt the smart contract 212 and/or the distributed ledger 213 by using the public key.

According to an embodiment, the processor 130 may decrypt the data encrypted with the public key, through the key-manager 223. According to an embodiment, since only the key-manager 223 has the private key 224 corresponding to the public key, the processor 130 may decrypt the data encrypted with the public key, by using the private key 224, through the key-manager 223. For example, the processor 130 may request the decryption of the smart contract 212 encrypted with the public key and/or the distributed ledger 213 encrypted with the public key, to the key-manager 223. The key-manager 223 having obtained the request may perform the decryption of the encrypted smart contract 212 and/or the distributed ledger 213 encrypted with the public key, by using the private key 224 stored in the key storage. According to an embodiment, the public key and the private key 224 provided based on the key-manager 223 may be provided based on a user account of the electronic device 100.

The processor 130 may perform digital signature with the device unique key 221 through the key-manager 223. For example, the key-manager may perform the digital signature, based on the device unique key 221 stored in the security module 120. Also, the key-manager 223 may check and validate a value digitally signed with the device unique key 221, based on the device certificate 222. For example, the key-manager 223 may validate the blockchain application 211 digitally signed with the device unique key 221, through the device certificate 222.

As described above, an electronic device (e.g., the electronic device 100 of FIG. 1) constituting a first block node that is included in a blockchain network may include a communication circuit (e.g., the communication circuit of FIG. 1) for communicating with a second block node and a server node that are included in the blockchain network, and a security module (e.g., the security module 120 of FIG. 1) for storing a unique key (e.g., the device unique key 221 of FIG. 2) granted to the electronic device, a certificate (e.g., the device certificate 222 of FIG. 2) for the unique key, and a private key (e.g., the private key of FIG. 2) for a user account, and a memory (e.g., the memory 110 of FIG. 1) for storing a first smart contract and a blockchain application (e.g., the blockchain application 211 of FIG. 2) that is digitally signed with the unique key, and at least one processor electrically connected to the communication circuit, the security module, and the memory. The at least one processor (e.g., the processor 130 of FIG. 1) may, in response to an input of requesting a transaction, obtain first input data, output data, and a first identification value indicating a unique value capable of identifying the first smart contract, based on the first smart contract, and validate the blockchain application by using the certificate, and forward a public key for the private key and an input data request to the second block node, based on the validation result, and receive, from the second block node, second input data encrypted with the public key and a second identification value indicating a unique value capable of identifying a second smart contract previously stored in the second block node, the second input data being data required for the execution of the second smart contract, and transmit transaction data including the first input data and the output data to the server node, based on the comparison result of the first identification value and the second identification value.

According to an embodiment, the at least one processor may forward a nonce request to a first server through the communication circuit, and obtain a nonce from the first server in response to the nonce request, and perform digital signature for information on the blockchain application, and the nonce, through the unique key, and transmit the digitally signed nonce and information on the blockchain application, to the first server, and obtain a certificate for the first server that is provided based on the digitally signed nonce, from the first server, and store the first server certificate in the memory.

According to an embodiment, when communicating with the second block node through the communication circuit, the at least one processor may communicate through a second server that may be used by a block node endorsed based on the first server certificate among the block nodes included in the blockchain network.

According to an embodiment, the security module may include a key-manager capable of providing a key-pair. The at least one processor may provide the private key and the public key through the key-manager.

According to an embodiment, the at least one processor may encrypt the first smart contract with the public key through the key-manager, and store the encrypted first smart contract in the memory.

According to an embodiment, the first input data and the output data may be obtained by that the at least one processor decrypts the encrypted first smart contract with the private key and executes the decrypted first smart contract.

According to an embodiment, the at least one processor may transmit the transaction data to the server node, based on the comparison result of the first input data and the second input data.

According to an embodiment, the at least one processor may encrypt a ledger for the blockchain network with the public key, and store the encrypted ledger in the memory.

According to an embodiment, the at least one processor may decrypt the encrypted ledger by using the private key so as to execute the first smart contract, and obtain data required for executing the first smart contract from the decrypted ledger and execute the first smart contract.

According to an embodiment, the at least one processor may obtain an update request for the ledger from the server node in response to transmitting the transaction data, and update the ledger in response to the update request for the ledger.

As described above, an operating method of an electronic device (e.g., the electronic device 100 of FIG. 1) constituting a first block node included in a blockchain network may include, in response to an input of requesting a transaction, obtaining first input data, output data, and a first identification value indicating a unique value capable of identifying a first smart contract, based on the first smart contract, and validating a blockchain application by using a certificate that is based on a unique key for the electronic device, and forwarding a public key for a user account and an input data request, to a second block node included in the blockchain network, based on the validation operation, and receiving, from the second block node, second input data encrypted with the public key, and a second identification value indicating a unique value capable of identifying a second smart contract previously stored in the second block node, the second input data being data required for the execution of the second smart contract, and comparing the first identification value and the second identification value, and transmitting transaction data including the first input data and the output data, to a server node included in the blockchain network, based on the result of the comparing operation. The electronic device may include a security module for storing the unique key, the certificate, and a private key corresponding to the public key, and include a memory for storing the first smart contract and/or the blockchain application digitally signed with the unique key.

According to an embodiment, the method may include requesting a nonce to a first server, and obtaining the nonce from the first server in response to the requesting operation, and performing digital signature on the nonce through the unique key, and transmitting the digitally signed nonce to the first server, and obtaining, from the first server, a certificate for a first server that is provided based on the digitally signed nonce, and storing the first server certificate in the memory.

According to an embodiment, the method may include providing a secure connection with the second block node through a second server, based on the certificate for the first server, and transmitting and/or receiving a signal with the second block node through the secure connection. The second server may be used by a block node that is endorsed based on the certificate for the first server.

According to an embodiment, the method may further include providing the private key and the public key through a key-manager included in the security module.

According to an embodiment, the method may further include encrypting the first smart contract with the public key through the key-manager, and storing the encrypted first smart contract in the memory.

According to an embodiment, transmitting to the server node may include comparing the first input data and the second input data, and transmitting the transaction data to the server node, based on the comparison result.

According to an embodiment, the method may further include encrypting a ledger for the blockchain network with the public key, and storing the encrypted ledger in the memory.

According to an embodiment, the method may further include decrypting the encrypted ledger by using the private key so as to execute the first smart contract, and obtaining data for executing the first smart contract from the decrypted ledger, and executing the first smart contract, based on the obtained data.

As described above, in a blockchain system at least including a first electronic device and a second electronic device as block nodes, respectively, and including a first server and a second server, the first electronic device may include a security module for storing a private key for a user account, a unique key for the first electronic device, and a certificate for the unique key, and the first electronic device may include a memory for storing a first server certificate that is obtained from the first server, based on the unique key, a blockchain application encrypted with a public key corresponding to the private key, and a first smart contract encrypted with the public key, and the first electronic device may, in response to a transaction request, provide a secure connection with the second electronic device through the second server, the secure connection being provided as the second server validates the first server certificate, and forward the public key corresponding to the private key and an input data request to the second electronic device through the secure connection, and receive a second identification value indicating a unique value capable of identifying a second smart contract previously stored in the second electronic device, encrypted with the public key, and second input data about the second smart contract, from the second electronic device, through the secure connection, and validate the transaction, based on at least one comparison result among the comparison result of a first identification value indicating a unique value capable of identifying the first smart contract and the second identification value, and the comparison result of first input data about the first smart contract and the second input data.

According to an embodiment, the secure connection may be provided by that the second electronic device receives a secure connection request from the second server and, in response to the secure connection request, the second server validates the first server certificate previously stored in the second electronic device, and as the transaction is validated, the first electronic device may forward transaction data including output data and the first input data which are obtained based on the first smart contract, to a server device included in the blockchain network, and the server device may provide a block, based on the transaction data.

Figure 3:
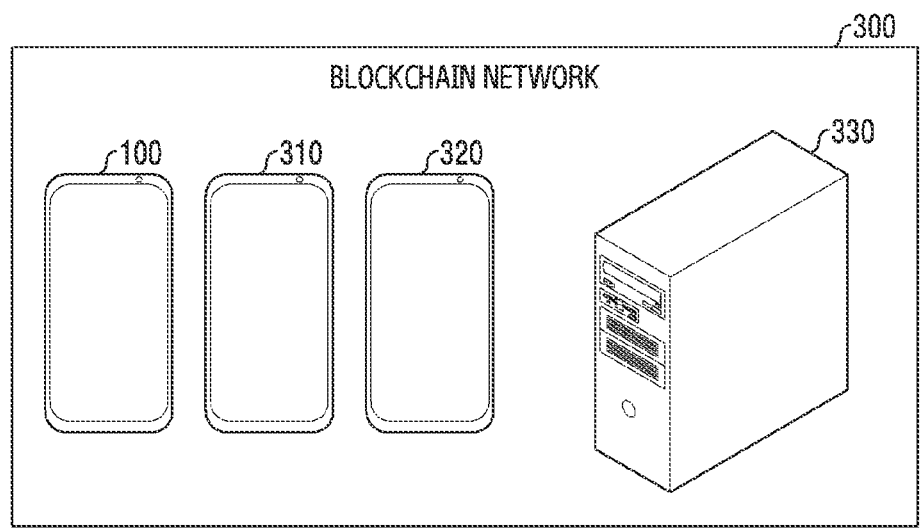
FIG. 3 is a diagram for explaining a blockchain network according to an embodiment of the disclosure.

FIG. 3 is a diagram for explaining a blockchain network according to an embodiment of the disclosure.

Referring to FIG. 3, a plurality of electronic devices 100, 310, 320, and 330 may constitute a blockchain network 300. The plurality of electronic devices 100, 310, 320, and 330 constituting the blockchain network 300 may include a portable electronic device. For example, the plurality of electronic devices 100, 310, 320, and 330 may correspond to a mobile device, a tablet personal computer (PC), and/or a laptop computer. According to an embodiment, the electronic device 100, a first external device 310, and a second external device 320 may be portable mobile nodes, and a third external device 330 may be a server node. According to various embodiments, the blockchain network 300 may include a plurality of server nodes similar to the third external device 330. According to an embodiment, each of the plurality of electronic devices 100, 310, 320, and 330 may own the entire ledger of the blockchain network 300, or may include a partial ledger including a part of the entire ledger.

According to an embodiment, the plurality of electronic devices 100, 310, 320, and 330 may include a construction similar to that of the electronic device 100. For example, the plurality of electronic devices 100, 310, 320, and 330 are constructions for performing operations required in the blockchain network, and may include a blockchain application, a smart contract, a distributed ledger, and the first server certificate 214. Also, the plurality of electronic devices 100, 310, 320, and 330 may include a device unique key, a device certificate, and a key-manager. According to the disclosure, it has been described that four electronic devices constitute the blockchain network for description's convenience sake, but the disclosure is not limited thereto.

In an embodiment, the third external device 330 may be a server node. The third external device 330 serving as the server node may store the entire ledger of the blockchain network 300. According to an embodiment, the third external device 330 may perform all transaction provision and block recording in the blockchain network 300. According to an embodiment, the third external device 330 may obtain, from the electronic device 100, a transaction for which an endorsement operation has been completed between block nodes included in the blockchain network 300, and transaction data including input data (e.g., a read-set) and output data (e.g., a write-set) of smart contract on the transaction. For example, the third external device 330 may obtain a transaction for which an endorsement operation has been completed between block nodes included in the blockchain network 300, and transaction data including first input data and output data of a first smart contract on the transaction. According to an embodiment, the third external device 330 may arrange the obtained transaction data in a sequence, then perform a consensus operation for the transaction, and provide a block.

In an embodiment, the electronic device 100, the first external device 310, and/or the second external device 320 may be a mobile node of the blockchain network 300. According to an embodiment, the electronic device 100, the first external device 310, and/or the second external device 320 serving as the mobile node may perform transaction provision and block recording in the blockchain network 300. For example, the electronic device 100, the first external device 310, and/or the second external device 320 may participate in a transaction endorsement operation, respectively, and store a block of a related transaction and state data in the in-device memory 110 in response to obtaining a block provision request and an update request from the third external device 330.

According to an embodiment, each of the plurality of electronic devices 100, 310, and 320 except some nodes (e.g., the third external device 330) in the blockchain network 300 may validate a smart contract so as to endorse a transaction, and as the validation of the smart contract is completed, only some of the plurality of electronic devices 100, 310, 320, and 330 may execute the smart contract.

In an embodiment, the plurality of electronic devices 100, 310, 320, and 330 may perform a validation operation for a smart contract, and determine whether to execute a transaction through a mutual consensus, based on the validation result. For example, the plurality of electronic devices 100, 310, 320, and 330 may determine whether to confirm a block. For example, the plurality of electronic devices 100, 310, 320, and 330 each may compare hash values of the smart contracts, and determine, when the same hash value is obtained in all, that the validation of the smart contract is completed and a transaction endorsement succeeds. By a consensus of the plurality of electronic devices 100, 310, 320, and 330, a transaction may be made into a block, and be added as a new node to the end of a blockchain of a distributed ledger stored in each of devices related to transaction execution. Also, a key value stored in a state database of the devices related to the transaction execution among the plurality of electronic devices 100, 310, 320, and 330 may be updated by the transaction execution. According to various embodiments, the operation of validating the smart contract so as to endorse the transaction is described in detail below with reference to FIGS. 5 to 7.

Figure 4:
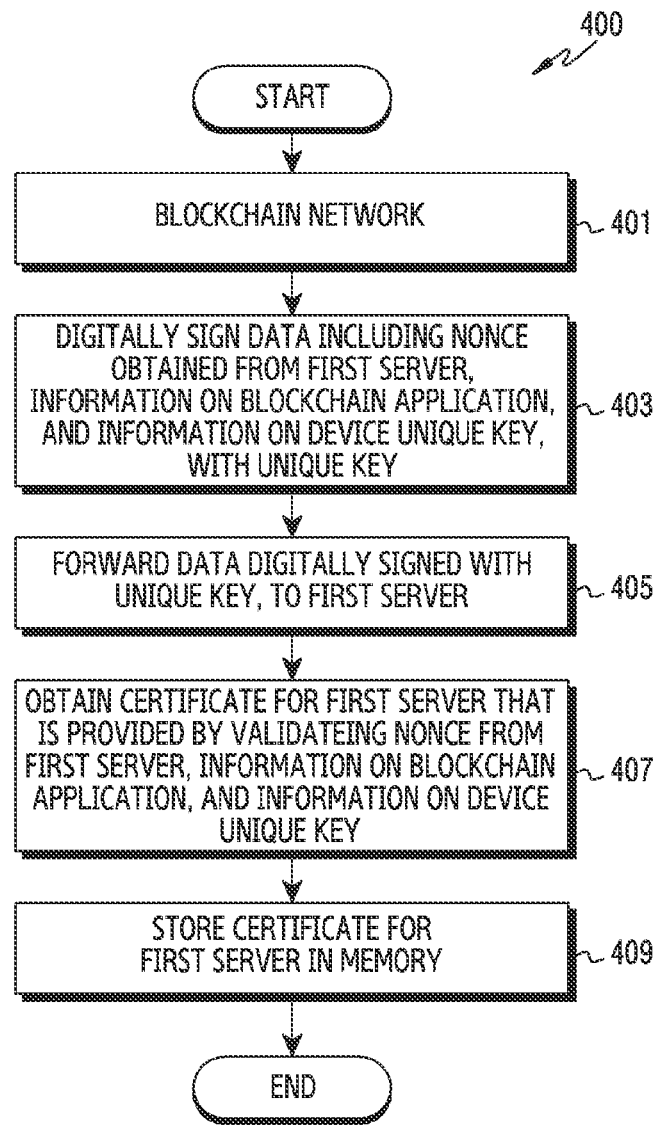
FIG. 4 is a flowchart illustrating an operation of storing a certificate for a first server according to an embodiment of the disclosure.

FIG. 4 is a flowchart for explaining an operation of storing a certificate for a first server according to an embodiment of the disclosure.

Referring to FIG. 4, in flowchart 400 a processor 130 may receive the issuance of a first server certificate 214 from the first server through the validation of an electronic device 100 and/or a blockchain application 211 and store the first server certificate 214. According to an embodiment, in operation 401, the processor 130 may request a nonce to the first server. For example, the processor 130 may execute the blockchain application 211, to request the nonce to the first server.

According to an embodiment, the processor 130 may perform, through the device unique key 221, digital signature on the nonce obtained in response to the nonce request, and information on the blockchain application 211. For example, in operation 403, the processor 130 may digitally sign, with the device unique key 221, data including the nonce obtained from the first server, the information on the blockchain application 211, and information on the device unique key 221. According to an embodiment, the processor 130 may perform digital signature through the device unique key 221 by using an authentication module included in the security module 120. According to an embodiment, the processor 130 may forward the data to the authentication module through the blockchain application 211, and the authentication module having obtained the data may perform digital signature through the device unique key 221. When the data is forwarded to the authentication module, the blockchain application 211 may cut the data to a proper size and forward pieces (e.g., a data blob), when the size of the data is not proper for forwarding.

In operation 405, the processor 130 of an embodiment may forward the data digitally signed with the device unique key 221, to the first server. For example, the processor 130 may transmit the digitally signed nonce and information on the blockchain application 211, to the first server. According to an embodiment, the processor 130 may digitally sign, with a public key, the data digitally signed with the device unique key 221. For example, the processor 130 may digitally sign the digitally signed data with a public key for a user account, through the key-manager 223, and forward the data to the first server.

According to an embodiment, the processor 130 may obtain the first server certificate 214 that is provided based on the digitally signed nonce, from the first server. According to an embodiment, in operation 407, the processor 130 may obtain, through the blockchain application 211, the first server certificate 214 that is provided by validating the nonce obtained from the first server, the information on the blockchain application 211, and the information on the device unique key 221. According to an embodiment, the first server having received the data digitally signed with the device unique key 221 and the public key from the electronic device 100 may perform a validation operation for the electronic device 100 through the data. For example, the first server may validate integrity as to whether the nonce obtained from the first server digitally signed with the device unique key 221, the information on the blockchain application 211, and the information on the device unique key 221 have not been altered, by using the device certificate 222 stored in the first server. According to an embodiment, the first server may perform a validation operation on the data obtained from the electronic device 100, and when the integrity is validated, may provide the first server certificate 214. Also, the first server may forward the first server certificate 214 for the first server to the electronic device 100.

According to an embodiment, in operation 409, the processor 130 may store, in the memory 110, the first server certificate 214 obtained from the first server.

Figure 5:
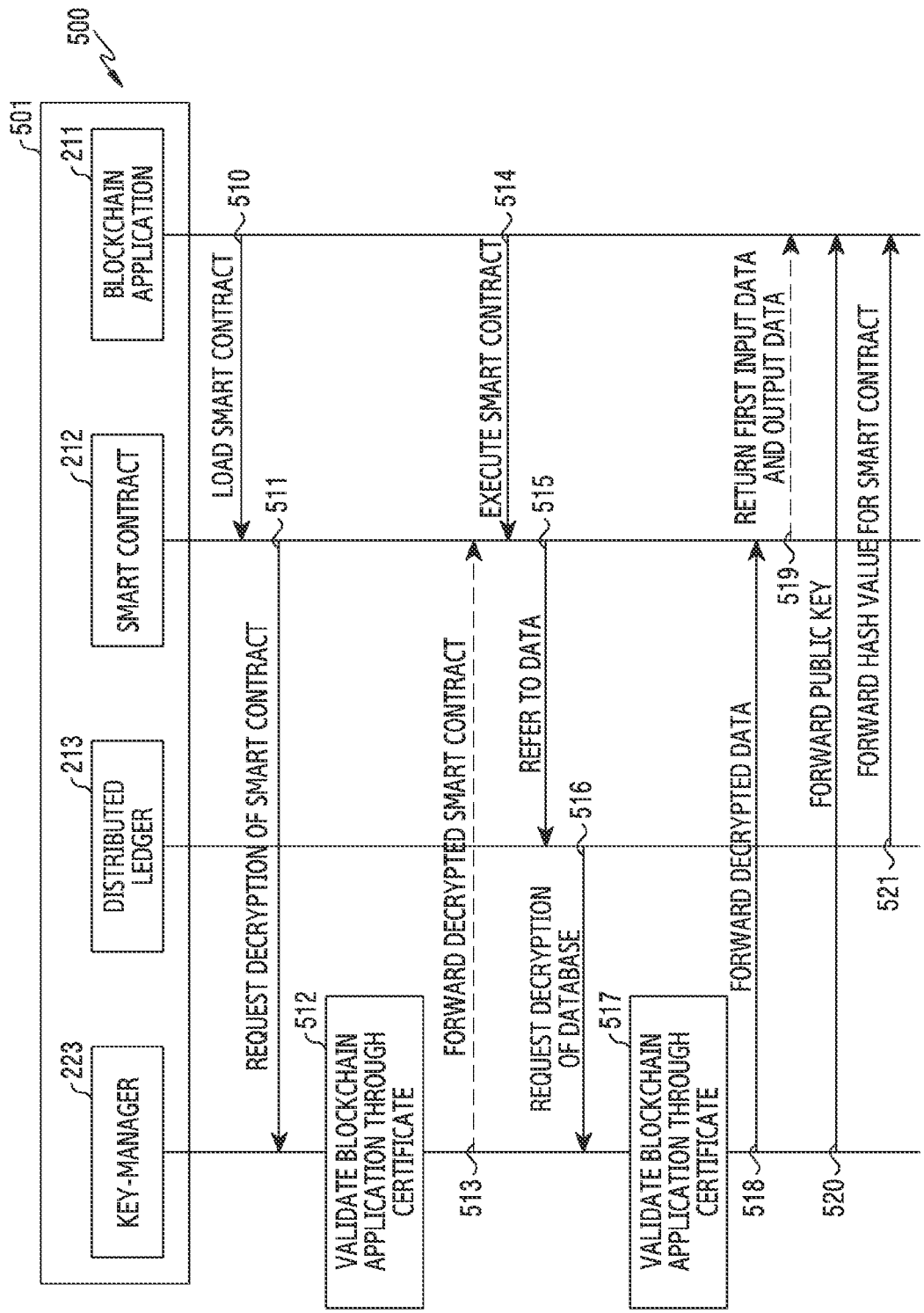
FIG. 5 is a flowchart illustrating an operation of executing a smart contract, based on a transaction execution request, in an electronic device according to an embodiment of the disclosure.

FIG. 5 is a flowchart illustrating an operation of executing a smart contract, based on a transaction execution request in an electronic device according to an embodiment of the disclosure.

Referring to FIG. 5, in flowchart 500 an electronic device 501 (e.g., the electronic device 100) may include the distributed ledger 213, the smart contract 212, the blockchain application 211, and the key-manager 223. In addition to the construction shown in FIG. 5, the electronic device 501 may include various constructions. Hereinafter, content overlapping with the content described with reference to FIG. 2 may be omitted. According to an embodiment, an operation performed by the components included in the electronic device 501 may be interpreted as being performed by the processor 130. For example, an operation performed by the blockchain application 211 may be interpreted as being performed by executing the blockchain application 211 through the processor 130, and as being performed by the processor 130.

According to an embodiment, the blockchain application 211 may request a smart contract load, in operation 510, to the smart contract 212. For example, the blockchain application 211 may obtain a transaction execution request from another application or a user, and in response to this, request the smart contract load, in operation 510, for a transaction to the smart contract 212.

According to an embodiment, the smart contract 212 may request, in operation 511, the decryption of a smart contract on the transaction requested to be performed, to the key-manager 223. According to an embodiment, the smart contract 212 may request the decryption of the smart contract encrypted with a public key, to the key-manager 223.

According to an embodiment, in response to the request of operation 511, the key-manager 223 may perform an operation of validation, in operation 512, of the blockchain application 211 through a certificate. According to an embodiment, the key-manager 223 may validate the blockchain application 211 signed with the device unique key 221, through the device certificate 222. For example, the key-manager 223 may validate that the blockchain application 211 has not been altered, through the device certificate 222. Also, the key-manager 223 may decrypt the smart contract 212 encrypted with the public key, through the private key 224.

According to an embodiment, as the integrity of the blockchain application 211 is validated, the key-manager 223 may forward, in operation 513, the decrypted smart contract 212. According to an embodiment, the blockchain application 211 may request the execution, in operation 514, of the smart contract, to the smart contract 212. For example, the blockchain application 211 may call a function executing the smart contract 212.

According to an embodiment, when data is required for the execution of the smart contract 212, the smart contract 212 may refer to, in operation 515, data in the distributed ledger 213. For example, the smart contract 212 may refer to first input data, which is the data (e.g., a read-set) required for the execution of the smart contract 212, in a state database of the distributed ledger 213.

According to an embodiment, the distributed ledger 213 may be encrypted with a public key. Accordingly, a request for the decryption of the distributed ledger 213 may be forwarded to the key-manager 223. For example, the distributed ledger 213 may make a database decryption request, in operation 516, to the key-manager 223.

According to an embodiment, in response to the request of operation 516, the key-manager 223 may perform an operation of validation, in operation 517, of the blockchain application 211 through a certificate. The operation of validation of operation 517 may be similar to the operation of validation of operation 512. Also, the key-manager 223 may decrypt, with the private key 224, the distributed ledger 213 encrypted with the public key. For example, the key-manager 223 may decrypt, with the private key 224, the state database of the distributed ledger 213 encrypted with the public key.

According to an embodiment, the key-manager 223 may forward, in operation 518, the decrypted data to the smart contract 212. For example, the first input data required for executing the smart contract 212 may be forwarded from the key-manager 223. According to an embodiment, the smart contract 212 may be executed based on the received first input data. As a result value of the smart contract 212, output data (e.g., a write-set) may be returned.

According to an embodiment, for example, as the smart contract 212 is executed, a set of data (required data) to read for the execution of the smart contract 212 and a set of data including a result value of the execution of the smart contract 212 may be returned. For example, as the smart contract 212 is executed, the first input data and the output data may be returned, in operation 519, to the blockchain application 211. Accordingly, the first input data and the output data provided based on the blockchain application 211 may be stored in the memory 110.

According to an embodiment, the key-manager 223 may forward, in operation 520, a public key to the blockchain application 211.

According to an embodiment, the smart contract 212 may forward, in operation 521, a hash value of the smart contract 212 to the blockchain application 211. For example, the blockchain application 211 may receive, in operation 521, a first hash value of a first smart contract. Accordingly, the blockchain application 211 may store the public key and the hash value in the memory 110.

Figure 6:
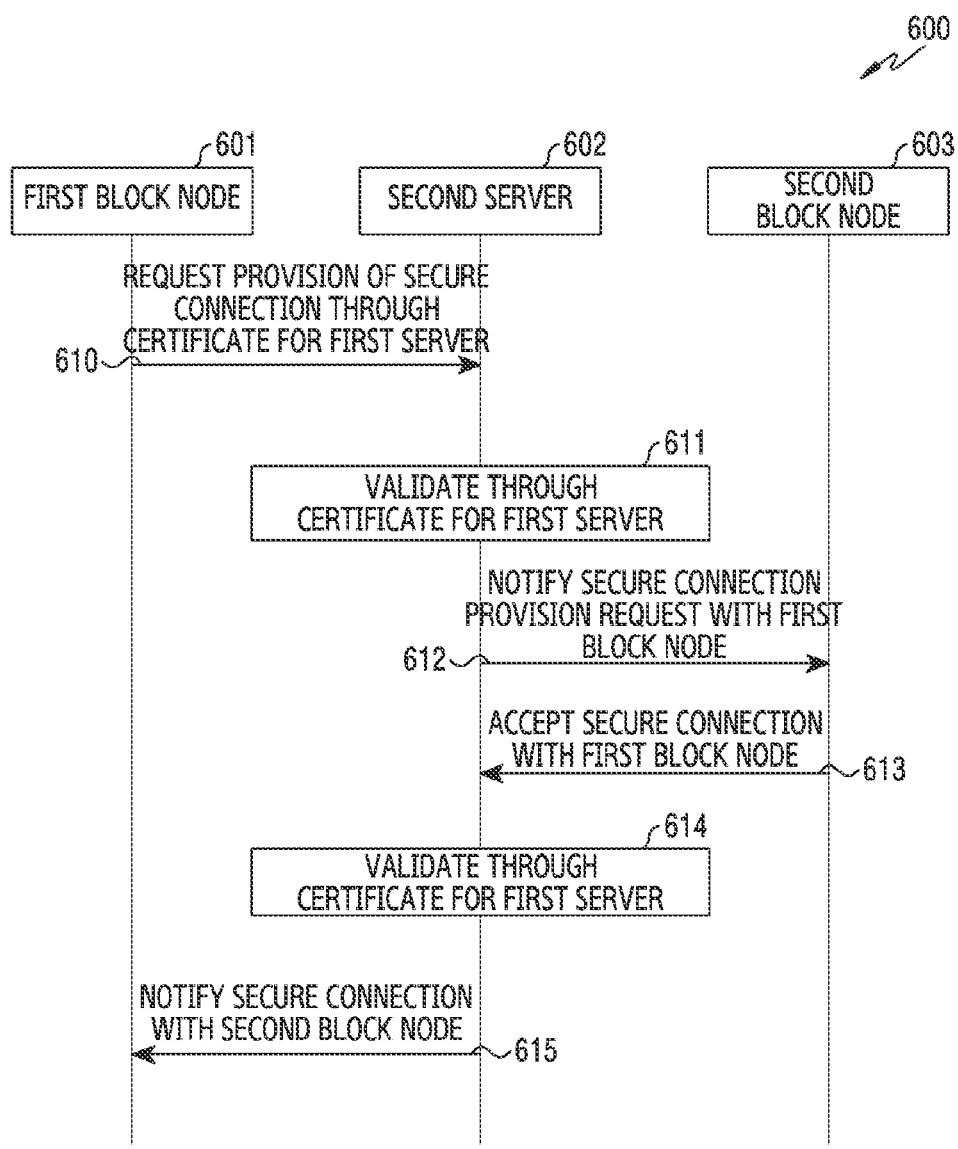
FIG. 6 is a flowchart illustrating an operation in which a first block node and a second block node included in a blockchain system establish a secure connection through a second server according to an embodiment of the disclosure.

FIG. 6 is a flowchart illustrating an operation in which a first block node and a second block node included in a blockchain system establish a secure connection through a second server according to an embodiment of the disclosure.

Referring to FIG. 6, in flowchart 600 a first block node 601 (e.g., an electronic device 100) and a second block node 603 (e.g., a first external device 310) constituting a block node of a blockchain network are included, and a second server 602 providing a secure connection between a first block node 601 and a second block node 603 is included. For description's convenience sake, only the secure connection between the first block node 601 and the second block node 603 has been described, but all nodes included in the blockchain network may establish a secure connection in the same method.

According to an embodiment, the first block node 601 may request, in operation 610, secure connection provision to the second server 602 through the first server certificate 214 for the first server.

According to an embodiment, in response to the request of operation 610, the second server 602 may perform a validation, in operation 611, operation through the first server certificate 214 for the first server. For example, the second server 602 may validate that the first block node 601 has not been altered, through the first server certificate 214 of the first block node 601.

According to an embodiment, the second server 602 may notify, in operation 612, the secure connection provision request with the first block node 601 to the second block node 603. For example, the second server 602 may forward that there has been a request to provide a secure connection from the first block node 601, as a push message, to the second block node 603.

According to an embodiment, in response to the notification of operation 612, the second block node 603 may forward a notification of accepting, in operation 613, the secure connection with the first block node 601, to the second server 602. For example, in response to the notification of operation 612, the second block node 603 may execute an internal blockchain application of the second block node 603 and perform an operation for secure connection provision.

According to an embodiment, in response to the acceptance of operation 613, the second server 602 may perform a validation, in operation 614, operation through the first server certificate 214 of the second block node 603. According to an embodiment, the first server certificate 214 stored in the second block node 603 may indicate a certificate that is obtained from the first server by performing a similar operation to the first block node 601. Accordingly, when it is validated that the first server certificate 214 for the first server has been stored in the second block node 603, it may be validated that the second block node 603 has not been altered, for example, the blockchain application of the second block node 603 has not been altered.

According to an embodiment, the second server 602 may provide a secure connection between the first block node 601 and the second block node 603, as the first block node 601 and the second block node 603 are validated through the first server certificate 214 for the first server.

According to an embodiment, the second server 602 may forward a secure connection notification, in operation 615, with the second block node 603, to the first block node 601.

According to an embodiment, the secure connection provided between the first block node 601 and the second block node 603 through the second server 602 may be a channel. Several block nodes on the blockchain network may transmit and/or receive transactions while maintaining confidentiality with each other via a channel through the second server 602. The channel may allow only block nodes belonging to the channel to access a transaction related to the channel, and not allow block nodes of all other networks to access the transaction.

Figure 7:
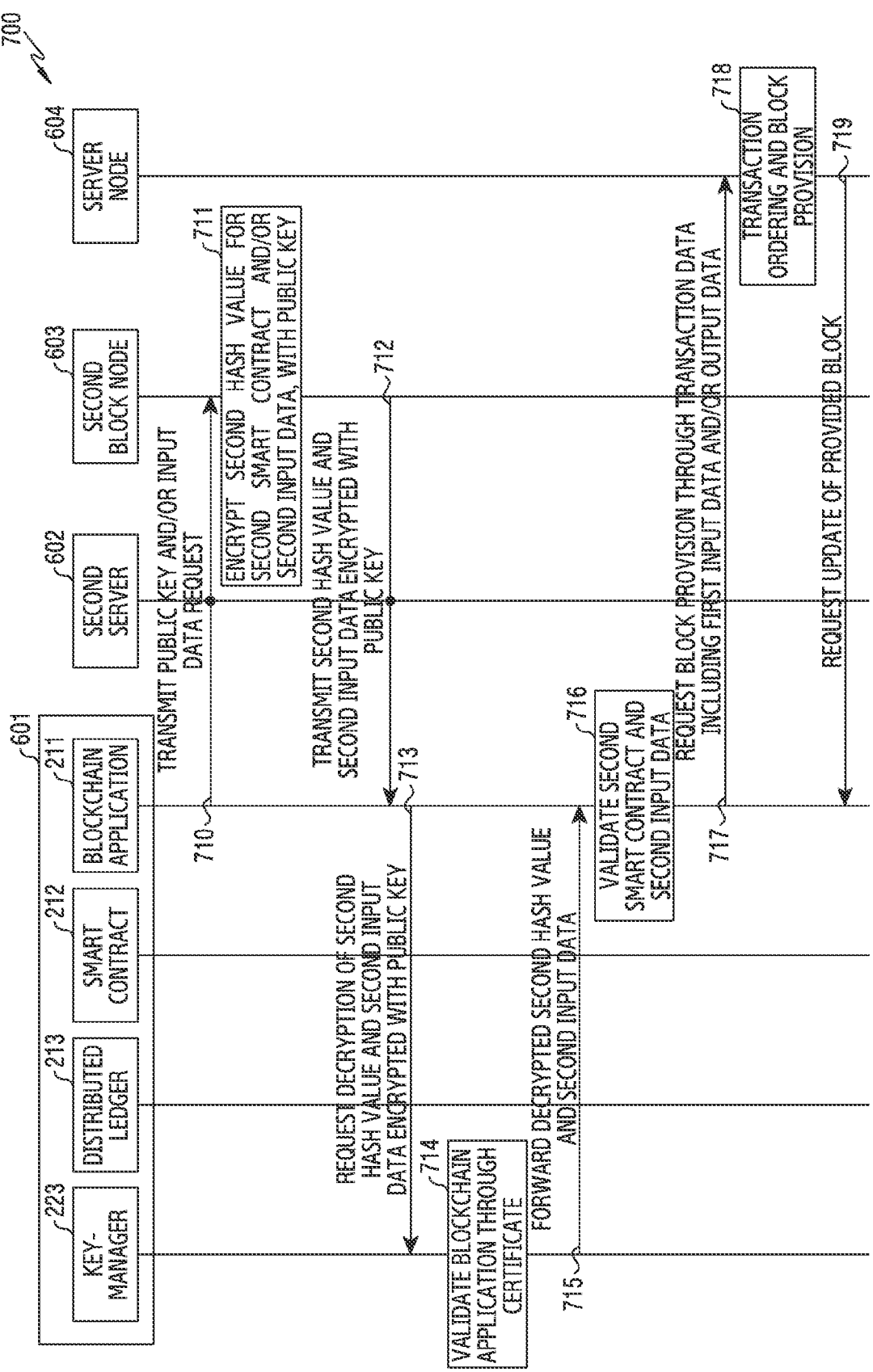
FIG. 7 is a flowchart for explaining a transaction endorsement operation through a second server in a blockchain network according to an embodiment of the disclosure.

FIG. 7 is a flowchart for explaining a transaction endorsement operation through a second server in a blockchain network according to an embodiment of the disclosure.

Referring to FIG. 7, in flowchart 700 a first block node 601 (e.g., an electronic device 100) and a second block node 603 (e.g., a first external device 310) providing the secure connection through the operation described with reference to FIG. 6 are illustrated. Also, a second server 602 and a server node 604 (e.g., the third external device 330) are illustrated. For description's convenience sake, only a transaction endorsement operation between the first block node 601 and the second block node 603 is illustrated, but the disclosure is not limited thereto and may be identically/similarly applied to a transaction endorsement operation between block nodes included in the blockchain network.

According to an embodiment, in response to obtaining a transaction execution request, the blockchain application 211 may perform a transaction endorsement operation. The blockchain application 211 may transmit, in operation 710, a public key and input data request to the second block node 603. For example, the blockchain application 211 may forward a public key stored in the memory 110 to the second block node 603. Also, the blockchain application 211 may request input data of a smart contract on a transaction, to the second block node 603, for the sake of transaction endorsement.

According to an embodiment, in response to the request transmission of operation 710, the second block node 603 may encrypt, in operation 711, a second hash value and second input data for a second smart contract, with the public key. For example, the second block node 603 may provide a second hash value of a second smart contract on a transaction previously stored in the memory 110, and may encrypt the second input data (e.g., a read-set) for the second smart contract with the public key obtained from the first block node 601.

According to an embodiment, the second block node 603 may transmit, in operation 712, the second hash value and second input data encrypted with the public key in operation 711, to the blockchain application 211. According to an embodiment, the transmission operations 710 and 712 between the first block node 601 and the second block node 603 may be performed using a secure connection provided through the second server 602.

According to an embodiment, the blockchain application 211 may request, in operation 713, the decryption of the second hash value and second input data encrypted with the public key, to the key-manager 223. According to an embodiment, the key-manager 223 may decrypt the second hash value and second input data encrypted with the public key, by using a private key.

According to an embodiment, the key-manager 223 may perform an operation of validating, in operation 714, the blockchain application 211 through a certificate, as to whether the blockchain application 211 has not been altered. According to an embodiment, the key-manager 223 may validate integrity as to whether the blockchain application 211 has not been altered, by using the device certificate 222 for the blockchain application 211 digitally signed with the device unique key 221. According to an embodiment, the key-manager 223 may forward, in operation 715, the decrypted second hash value and second input data to the blockchain application 211, based on a result of the validation of operation 714.

According to an embodiment, the blockchain application 211 may perform a second smart contract and second input data validation operation, in operation 716. According to an embodiment, the blockchain application 211 may perform the validation operation of operation 716, by using the first input data and hash value stored in the memory 110, through the operation described with reference to FIG. 5.

According to an embodiment, the blockchain application 211 may store, in the memory 110, a first hash value of a first smart contract on a transaction and first input data for the first smart contract. Accordingly, the blockchain application 211 may compare the first hash value of the first smart contract and the second hash value obtained from the second block node 603.

According to an embodiment, when smart contracts are the same as each other and have not been altered, the hash values of the smart contracts may be the same as each other. Accordingly, when the first smart contract and the second smart contract are the same as each other and have not been altered, the first hash value and the second hash value may be the same as each other. Accordingly, by comparing the first hash value and the second hash value, the blockchain application 211 may perform a validation operation for the second smart contract. According to an embodiment, when it is determined that the first hash value and the second hash value are not the same as each other as the comparison result of the first hash value and the second hash value, the blockchain application 211 may determine that the smart contracts are not the same as each other or have been altered, and terminate the transaction execution.

According to an embodiment, the blockchain application 211 may compare the first input data and the second input data. According to an embodiment, when the smart contracts are the same as each other without being altered, output data outputted as the smart contracts are executed using the same input data may be the same as each other. Accordingly, the blockchain application 211 may compare the first input data and the second input data.

According to an embodiment, when the first hash value and the second hash value are the same as each other, the blockchain application 211 may determine that it has been validated that the smart contracts of the first block node 601 and the second block node 603 are the same as each other. Also, when the first input data and the second input data are the same as each other, the blockchain application 211 may determine that it has been validated that the same output data will be returned when the same smart contract is executed. Accordingly, the blockchain application 211 may validate, through the second hash value and the second input data, that the output data returned as the second smart contract of the second block node 603 is executed will be the same as the output data returned as the first smart contract of the first block node 601 is executed, and determine that a transaction is endorsed. Through operation 710 to operation 716 of an embodiment, a transaction endorsement operation may be performed, even though the second block node 603 does not execute the second smart contract, in accordance with a transaction endorsement request.

According to an embodiment, as the validation of operation 716 is completed, the blockchain application 211 may request, in operation 717, block provision to the server node 604 through transaction data including first input data and output data.

According to an embodiment, in response to the request of operation 717, the server node 604 may perform a transaction ordering and block provision operation, in operation 718, for a transaction. According to an embodiment, when a plurality of server nodes exist in the blockchain network, the server node 604 may confirm the block through a consensus. The server node 604 may arrange the obtained transaction data in a sequence, then perform a consensus operation on the transaction, and provide the block.

According to an embodiment, the server node 604 may request, in operation 719, an update of the block provided by the blockchain application 211. According to an embodiment, the blockchain application 211 may obtain an update request for a ledger from the server node 604 in response to transmitting the transaction data, and update the ledger in response to the update request for the ledger. For example, in response to the update request of operation 719, the blockchain application 211 may connect the provided block to a blockchain included in the distributed ledger 213, and update a state database, based on the provided block.

The operation of the blockchain application 211 described with reference to FIGS. 5 to 7 may be executed by the processor 130. Accordingly, the operation of the blockchain application 211 may be expressed as an operation by the processor 130.

Figure 8:
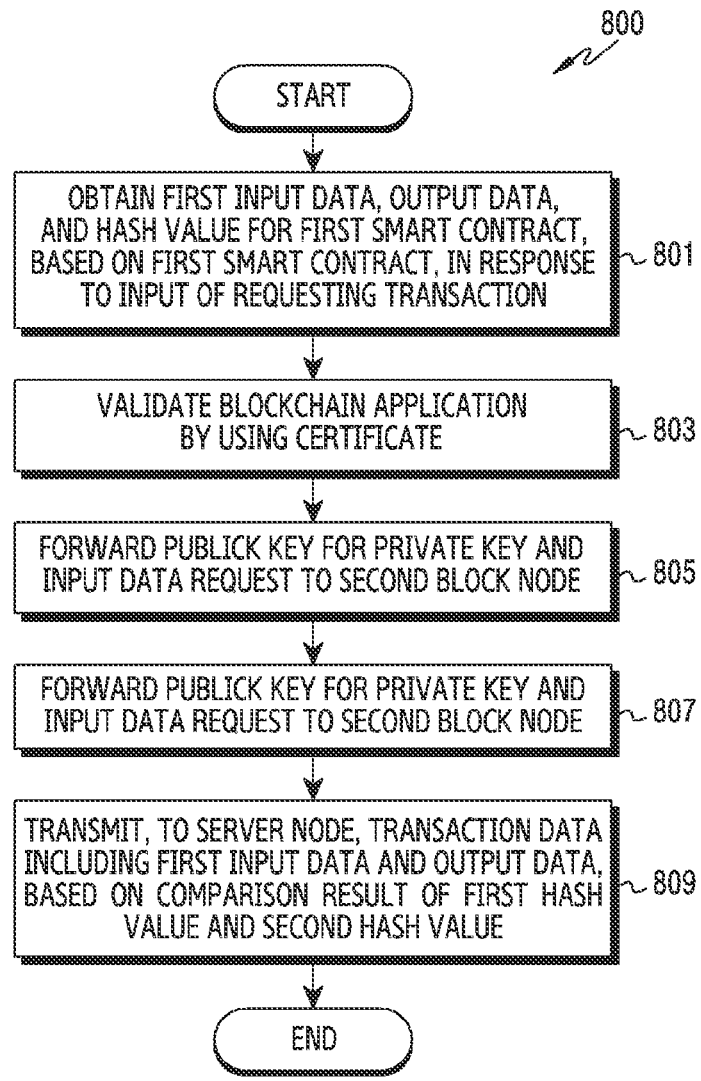
FIG. 8 is a flowchart for explaining a transaction endorsement operation in a blockchain network according to an embodiment of the disclosure.

FIG. 8 is a flowchart for explaining a transaction endorsement operation in a blockchain network according to an embodiment of the disclosure.

Referring to FIG. 8, in flowchart 800 a processor 130 may, in response to an input of requesting a transaction, in operation 801, obtain first input data, output data, and a first hash value of a first smart contract, based on the first smart contract. For example, when transaction provision from another application or a user has been requested to the blockchain application 211, the processor 130 may perform operation 801 in response to this. According to an embodiment, the processor 130 may obtain the first input data, the output data, and the first hash value, and store the same in the memory 110.

According to an embodiment, in operation 803, the processor 130 may validate the blockchain application 211 by using a certificate. According to an embodiment, the processor 130 may validate the device unique key 221 digitally signed to the blockchain application 211, through the device certificate 222, in order to determine whether the blockchain application 211 has not been altered. According to an embodiment, operation 803 may be requested to the key-manager 223 through the processor 130 and performed through the key-manager 223.

According to an embodiment, in operation 805, the processor 130 may forward a public key for the private key 224 and an input data request to a second block node (e.g., the first external device 310 of FIG. 3). For example, the processor 130 may forward the public key of the electronic device 100 to the second block node, in order to perform a transaction endorsement operation. Also, the processor 130 may forward a second input data request for a second smart contract previously stored in the second block node. In an embodiment, the second smart contract may be for a transaction requested to be provided.

According to an embodiment, in operation 807, the processor 130 may receive second input data encrypted with the public key, and a second hash value of the second smart contract previously stored in the second block node, from the second block node. According to an embodiment, the second block node may encrypt the second input data and the second hash value with the public key of the electronic device 100 received through operation 805, and forward the encrypted second input data and the second hash value to the electronic device 100.

According to an embodiment, in operation 809, the processor 130 may transmit transaction data including the first input data and the output data, to a server node (e.g., the third external device 330 of FIG. 3), based on the comparison result of the first hash value and the second hash value. According to an embodiment, the processor 130 may compare the first hash value and the second hash value, and when the first hash value and the second hash value match with each other as the comparison result, may validate that the second smart contract of the second block node has not been altered. For example, the processor 130 may validate that the second smart contract is the same as the first smart contract. For another example, when the first hash value and the second hash value do not match with each other as the comparison result, the processor 130 may determine that the second smart contract has been altered. Accordingly, the transaction provision operation may be stopped.

According to an embodiment, the processor 130 may compare the first input data and the second input data. When the first hash value and the second hash value are the same as each other, and the first input data and the second input data are the same as each other, the processor 130 may endorse that output data of the second smart contract executed based on the second input data in the second block node is the same as output data obtained in operation 801. Accordingly, the processor 130 may perform a transaction endorsement operation, without executing the second smart contract in the second block node.

According to an embodiment, when an endorsement operation for a transaction requested to be provided is completed, the processor 130 may forward a block provision request including transaction data to the server node. The server node may order the transaction data, and perform a block consensus operation according to a sequence, and provide and confirm a block.

Figure 9:
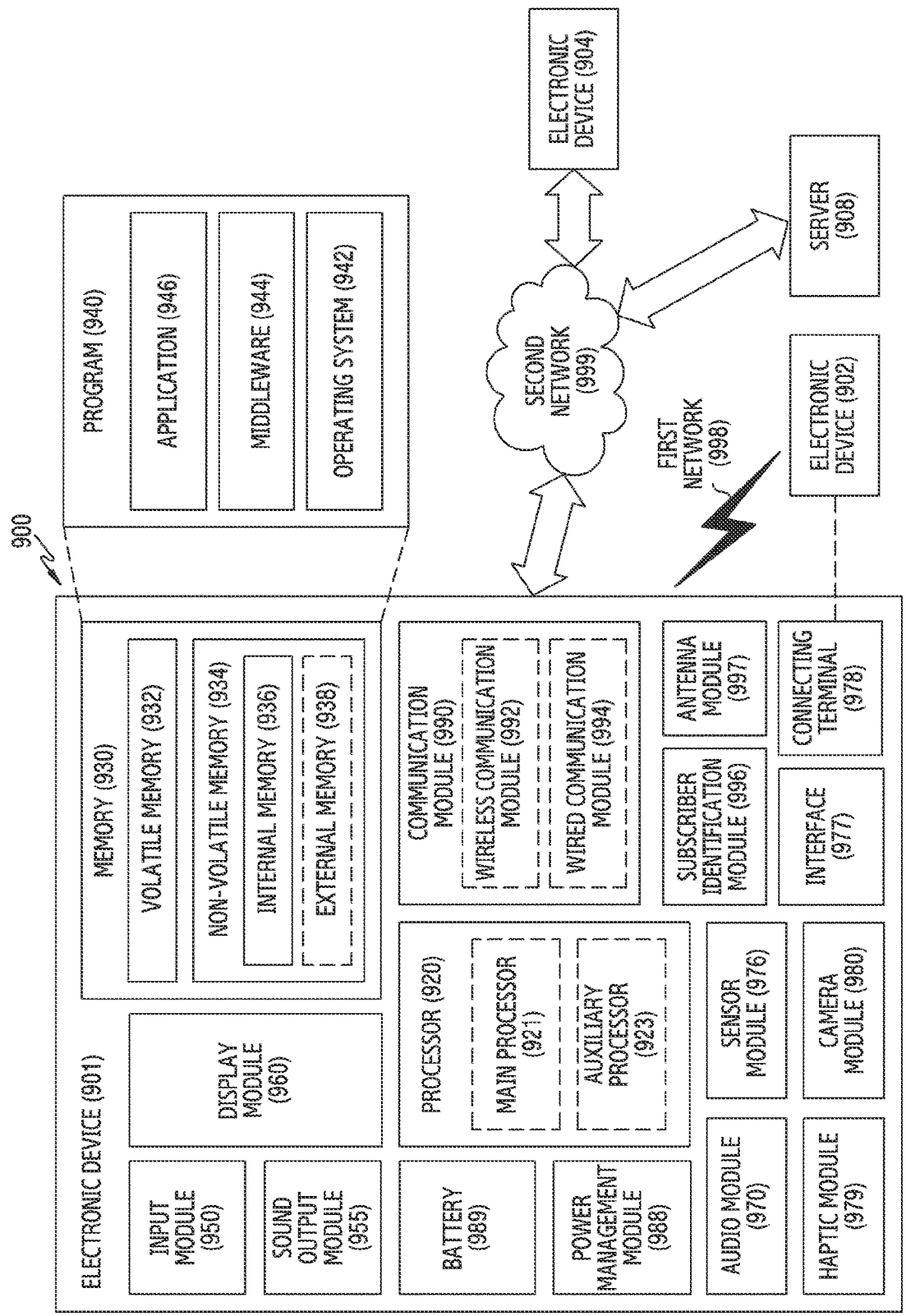
FIG. 9 is a block diagram of an electronic device in a network environment according to an embodiment of the disclosure.

FIG. 9 is a block diagram illustrating an electronic device in a network environment according to an embodiment of the disclosure.

Referring to FIG. 9, an electronic device 901 in a network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., the electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

The connecting terminal 978 may include a connector via which the electronic device 901 may be physically connected with the external electronic device (e.g., the electronic device 902). According to an embodiment, the connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5th generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902 and 904 or the server 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device constituting a first block node that is comprised in a blockchain network, the electronic device comprising:
   a communication circuit for communicating at least with a second block node and a server node that are comprised in the blockchain network;
   a security circuitry storing a unique key granted to the electronic device, a certificate for the unique key, and a private key for a user account;
   a memory storing a first smart contract and a blockchain application that is digitally signed with the unique key; and
   at least one processor electrically connected to the communication circuit, the security circuitry, and the memory,
   wherein the at least one processor is configured to:
      in response to an input of requesting a transaction, obtain first input data, output data, and a first identification value indicating a unique value for identifying the first smart contract, based on the first smart contract,
      validate the blockchain application by using the certificate,
      forward a public key for the private key and an input data request to the second block node, based on a validation result of validating the blockchain application,
      receive, from the second block node, second input data encrypted with the public key and a second identification value indicating a unique value for identifying a second smart contract previously stored in the second block node, the second input data being data required for executing the second smart contract, and
      transmit transaction data comprising the first input data and the output data to the server node, based on a comparison result of comparing the first identification value and the second identification value.

2. The electronic device of claim 1, wherein the at least one processor is further configured to:
   forward a nonce request to a first server through the communication circuit,
   obtain a nonce from the first server in response to the nonce request,
   perform digital signature for information on the blockchain application, and the nonce, through the unique key,
   transmit, to the first server, the digitally signed nonce and information on the blockchain application,
   obtain, from the first server, a first server certificate for the first server that is provided based on the digitally signed nonce, and
   store the first server certificate in the memory.

3. The electronic device of claim 2, wherein the at least one processor is further configured to:
   in case of communicating with the second block node through the communication circuit, communicate through a second server that is used by a block node endorsed based on the first server certificate among the block nodes comprised in the blockchain network.

4. The electronic device of claim 1,
   wherein the security circuitry comprises a key-manager configured to provide a key-pair, and
   wherein the at least one processor is further configured to provide the private key and the public key through the key-manager.

5. The electronic device of claim 4, wherein the at least one processor is further configured to:
   encrypt the first smart contract with the public key through the key-manager, and
   store the encrypted first smart contract in the memory.

6. The electronic device of claim 5, wherein, as at least part of the obtaining of the first input data and the output data, the at least one processor is further configured to:
   decrypt the encrypted first smart contract with the private key, and
   execute the decrypted first smart contract.

7. The electronic device of claim 1, wherein the at least one processor is further configured to:
   transmit the transaction data to the server node, based on a comparison result of comparing the first input data and the second input data.

8. The electronic device of claim 1, wherein the at least one processor is further configured to:
   encrypt a ledger for the blockchain network with the public key, and
   store the encrypted ledger in the memory.

9. The electronic device of claim 8, wherein the at least one processor is further configured to:
   decrypt the encrypted ledger by using the private key so as to execute the first smart contract,
   obtain data required for executing the first smart contract from the decrypted ledger, and
   execute the first smart contract.

10. The electronic device of claim 8, wherein the at least one processor is further configured to:
    obtain, from the server node, an update request for the ledger in response to transmitting the transaction data, and
    update the ledger in response to the update request for the ledger.

11. A method of operation of an electronic device constituting a first block node comprised in a blockchain network, the method comprising:
- in response to an input of requesting a transaction, obtaining first input data, output data, and a first identification value indicating a unique value for identifying a first smart contract, based on the first smart contract;
- validating a blockchain application by using a certificate that is based on a unique key for the electronic device;
- forwarding a public key for a user account and an input data request, to a second block node comprised in the blockchain network, based on a validation result of validating the blockchain application;
- receiving, from the second block node, second input data encrypted with the public key, and a second identification value indicating a unique value for identifying a second smart contract previously stored in the second block node, the second input data being data required for executing the second smart contract;
- comparing the first identification value and the second identification value; and
- transmitting, to a server node comprised in the blockchain network, transaction data comprising the first input data and the output data, based on a result of comparing the first identification value and the second identification value,
- wherein the electronic device comprises:
  - a security circuitry storing the unique key, the certificate, and a private key corresponding to the public key, and
  - a memory storing the first smart contract and the blockchain application digitally signed with the unique key.

12. The method of claim 11, further comprising:
- forwarding, to a first server, a nonce request;
- obtaining a nonce from the first server in response to the nonce request;
- performing digital signature on the nonce through the unique key;
- transmitting a digitally signed nonce to the first server;
- obtaining, from the first server, a first server certificate for the first server that is provided based on the digitally signed nonce; and
- storing the first server certificate in the memory.

13. The method of claim 12, further comprising:
- providing a secure connection with the second block node through a second server, based on the first server certificate for the first server; and
- at least one of transmitting or receiving a signal with the second block node through the secure connection,
- wherein the second server is used by a block node that is endorsed based on the first server certificate for the first server.

14. The method of claim 11, further comprising:
- providing the private key and the public key through a key-manager comprised in the security circuitry.

15. The method of claim 14, further comprising:
- encrypting the first smart contract with the public key through the key-manager; and
- storing the encrypted first smart contract in the memory.

16. The method of claim 11, wherein the transmitting to the server node comprises:
- comparing the first input data and the second input data; and
- transmitting the transaction data to the server node, based on a result of comparing the first input data and the second input data.

17. The method of claim 11, further comprising:
- encrypting a ledger for the blockchain network with the public key; and
- storing the encrypted ledger in the memory.

18. The method of claim 17, further comprising:
- decrypting the encrypted ledger by using the private key so as to execute the first smart contract;
- obtaining data for executing the first smart contract from the decrypted ledger; and
- executing the first smart contract, based on the obtained data.

19. A blockchain system comprising:
- a first electronic device and a second electronic device as block nodes, respectively;
- a first server; and
- a second server,
- wherein the first electronic device comprises:
  - a security circuitry storing a private key for a user account, a unique key for the first electronic device, and a certificate for the unique key, and
  - a memory storing a first server certificate that is obtained from the first server, based on the unique key, a blockchain application encrypted with a public key corresponding to the private key, and a first smart contract encrypted with the public key, and
- wherein the first electronic device is configured to:
  - in response to a transaction request, provide a secure connection with the second electronic device through the second server, the secure connection being provided as the second server validates the first server certificate,
  - forward, to the second electronic device through the secure connection, the public key corresponding to the private key and an input data request,
  - receive, from the second electronic device through the secure connection, a second identification value indicating a unique value for identifying a second smart contract previously stored in the second electronic device, encrypted with the public key, and second input data about the second smart contract, and
  - validate the transaction, based on at least one comparison result among a first comparison result of a first identification value indicating a unique value for identifying the first smart contract and the second identification value, and a second comparison result of first input data about the first smart contract and the second input data.

20. The blockchain system of claim 19,
- wherein the secure connection is provided by the second electronic device receiving a secure connection request from the second server and, in response to the secure connection request, the second server validates the first server certificate previously stored in the second electronic device,
- wherein, as the transaction is validated, the first electronic device is further configured to forward transaction data comprising output data and the first input data which are obtained based on the first smart contract, to a server device comprised in a blockchain network, and
- wherein the server device provides a block, based on the transaction data.

* * * * *